Figure 1:
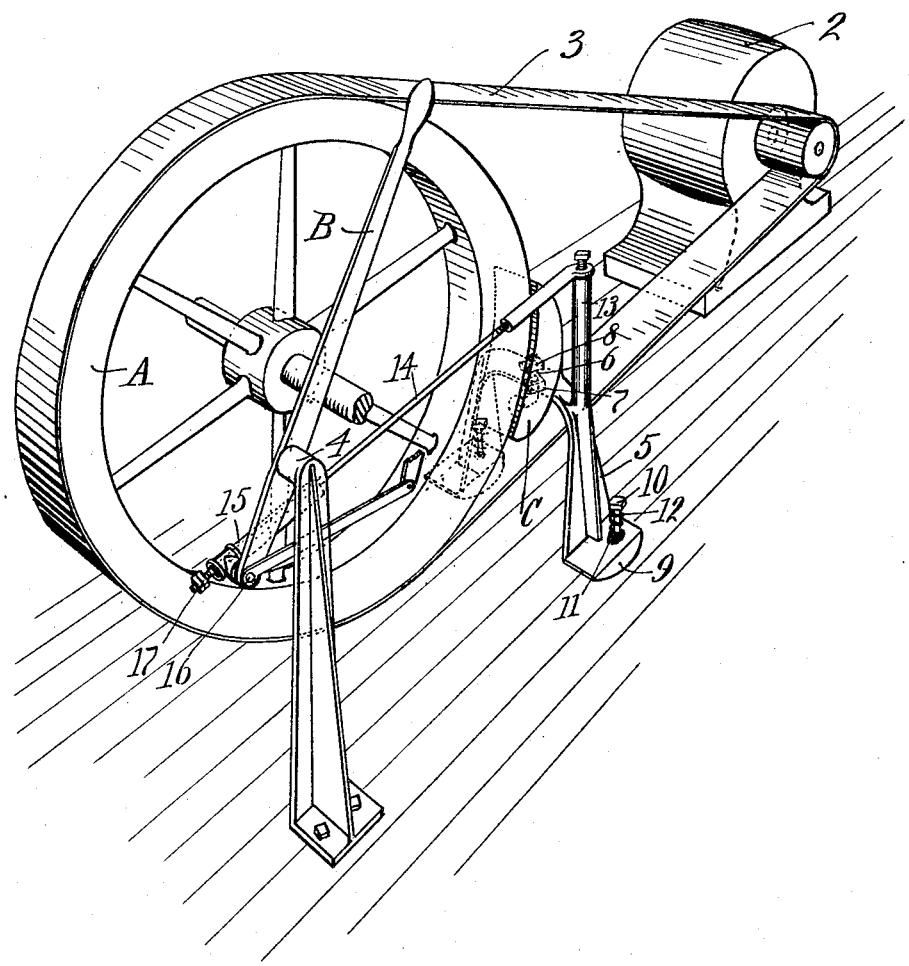

W. E. HAMILTON & G. T. NYHAGEN.
PLATEN PRESS BRAKE.
APPLICATION FILED MAY 4, 1908.

1,123,279.

Patented Jan. 5, 1915.
2 SHEETS—SHEET 1.

W. E. HAMILTON & G. T. NYHAGEN.
PLATEN PRESS BRAKE.
APPLICATION FILED MAY 4, 1908.
1,123,279.
Patented Jan. 5, 1915.
2 SHEETS—SHEET 2.
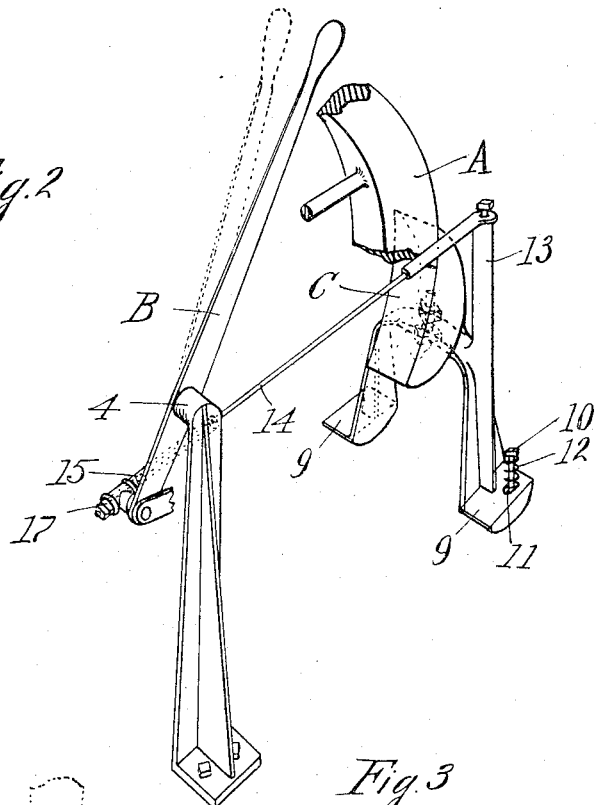
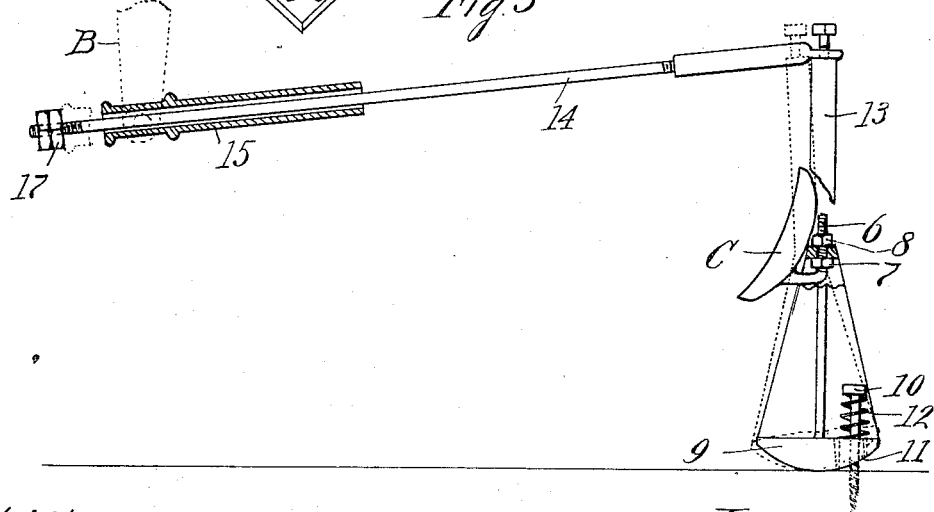
Witnesses,
George Voelker
H. Smith.
Inventors,
William E. Hamilton
George T. Nyhagen
by Lothrop & Johnson
their Attorneys.

UNITED STATES PATENT OFFICE.

WILLIAM EDWIN HAMILTON AND GEORGE T. NYHAGEN, OF ST. PAUL, MINNESOTA; SAID NYHAGEN ASSIGNOR, BY MESNE ASSIGNMENTS, TO EDWARD W. BUDKE, OF ST. PAUL, MINNESOTA.

PLATEN-PRESS BRAKE.

1,123,279.  Specification of Letters Patent.  Patented Jan. 5, 1915.

Application filed May 4, 1908.  Serial No. 430,777.

*To all whom it may concern:*

Be it known that we, WILLIAM EDWIN HAMILTON and GEORGE T. NYHAGEN, both citizens of the United States, and residents of St. Paul, in the county of Ramsey and State of Minnesota, have invented certain new and useful Improvements in Platen-Press Brakes, of which the following is a specification.

Our invention relates to improvements in brakes for platen printing presses, its object being to provide a new and simple construction of brake actuatable from the throw off lever of the press.

To this end the invention consists in the features of construction and arrangement of parts hereinafter particularly described and claimed.

In the accompanying drawings forming part of this specification, Figure 1 is a perspective view of our invention and adjacent parts; Fig. 2 is an enlarged view of the same in braking position partly broken away, and Fig. 3 is a side elevation partly in section.

Referring to the drawings A represents the fly wheel of the ordinary Chandler & Price platen printing press shown connected with a suitable motor 2 by a belt 3. B represents ordinary throw off lever of this type of platen printing press, the lever being used to throw the impression on or off. As shown the lever has suitable fulcrum support 4.

C represents a brake shoe shaped to conform to the periphery of the fly wheel. The brake shoe is supported upon the standard 5 by a vertical bolt 6 carrying a bottom check nut 7 and a top check nut 8, these check nuts in conjunction with the bolt holding the shoe and allowing it to be vertically adjusted on the stand. The brake stand 5 has rocker feet 9 which rest upon the floor and is secured thereto by lag screws 10 secured in the floor and extending through enlarged openings 11 in the rear ends of the rocker feet, a coil spring 12 being interposed between the head of the lag screw and said feet. This coil spring will thus hold the brake stand and brake in normal position, and the play between the lag screws and rocker feet will allow for swinging of the brake stand to carry the brake into and out of braking position.

Carried by one side of the brake stand is a vertical standard 13 to the top of which is connected one end of a rod 14, the opposite end of the rod being slidable through a sleeve 15 having suitable pivotal support 16 upon the lower end of the throw off lever B. A check nut 17 is threaded upon the outer end of the rod 14 to regulate the throw of the brake. The check nut 17 is so positioned with reference to the sleeve that the ordinary throw of the throw off lever in connection with the impression will not exert pressure against the nut 17 and consequently will not throw on the brake. If it is desired to throw on the brake the throw off lever is carried an additional distance forward to bring the sleeve against the nut 17 and by pressing thereon to draw forwardly the rod 14 and rock the stand forwardly to carry the shoe into braking position against the fly wheel. The throw off lever 11 has nothing to do with throwing off the power, but simply throws on or off the impression, and the brake mechanism does not interfere with the ordinary action of the lever. As stated it is merely necessary in order to apply the brake to give an additional throw to the throw off lever.

We claim as our invention:

In combination with the fly wheel and pressure throw off lever of a machine of the class described, a stand, a rocker supporting the lower end of said stand, a brake shoe carried by said stand and in coöperation with the fly wheel, a lever connection between the upper end of said stand and said throw off lever, said lever mechanism having yielding connection with said throw off lever, and a bearing spring upon one side of said rocker whereby to hold said lever mechanism in a position normally allowing play between said lever mechanism and throw off lever.

WILLIAM EDWIN HAMILTON.
GEORGE T. NYHAGEN.

Witnesses:
 PETER MANDRO,
 C. B. SCHMIDT.

Copies of this patent may be obtained for five cents each, by addressing the "Commissioner of Patents, Washington, D. C."